(12) United States Patent
Chen et al.

(10) Patent No.: US 7,164,789 B2
(45) Date of Patent: Jan. 16, 2007

(54) THREE-DIMENSIONAL ACTIVE VISION WITH GLYPH ADDRESS CARPET

(75) Inventors: Jindong Chen, Belmont, CA (US); Lichan Hong, Moutain View, CA (US); David L. Hecht, Palo Alto, CA (US); Ruth E. Rosenholtz, Cambridge, MA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 752 days.

(21) Appl. No.: 10/638,769

(22) Filed: Aug. 11, 2003

(65) Prior Publication Data

US 2005/0036672 A1 Feb. 17, 2005

(51) Int. Cl.
*G06K 9/00* (2006.01)

(52) U.S. Cl. .............. 382/154; 382/100; 382/203; 382/232; 345/419; 345/467; 235/494

(58) Field of Classification Search .......... 382/100, 382/154, 306, 309, 203, 232, 181; 345/419, 345/467, 583; 235/494, 456, 454, 462.09; 713/176
See application file for complete search history.

(56) References Cited

U.S. PATENT DOCUMENTS

| | | | |
|---|---|---|---|
| 5,675,407 A | 10/1997 | Geng | 356/147 |
| 5,825,933 A | 10/1998 | Hecht | 382/243 |
| 6,049,384 A | 4/2000 | Rudd et al. | 356/376 |
| 6,057,833 A * | 5/2000 | Heidmann et al. | 715/726 |
| 6,076,738 A | 6/2000 | Bloomberg et al. | 235/494 |
| 6,219,063 B1 * | 4/2001 | Bouguet et al. | 345/426 |
| 6,438,272 B1 * | 8/2002 | Huang et al. | 382/286 |
| 6,512,844 B1 | 1/2003 | Bouguet et al. | 382/154 |
| 6,549,288 B1 * | 4/2003 | Migdal et al. | 356/603 |
| 7,034,830 B1 * | 4/2006 | Perry et al. | 345/441 |
| 2002/0024593 A1 | 2/2002 | Bouguet et al. | 348/46 |
| 2002/0050518 A1 * | 5/2002 | Roustaei | 235/454 |
| 2003/0066949 A1 | 4/2003 | Mueller et al. | 250/208.1 |

OTHER PUBLICATIONS

U.S. Appl. No. 10/270,698, filed Oct. 16, 2002, David L. Hecht.
Olaf Hall-Holt, Szymon Rusinkiewica, Stripe Boundary Codes for Real-Time Structured-Light Range Scanning of Moving Objects, ICCV 2001, pp. 1-8.
Li Zhang, Brian Curless, Steven M. Seitz, Rapid Shape Acquisition Using Color Structured Light and Multi-pass Dynamic Programming, 1st International Symposium on 3D Data Processing, Visualization, and Transmission, Padova, Italy, Jun. 19-21, 2002, pp. 1-13.
David L. Hecht, Printed Embedded Data Graphical User Interfaces, IEEE Computer, Mar. 2001, V34, n3, pp. 47-55.

* cited by examiner

Primary Examiner—Sheela Chawan
(74) Attorney, Agent, or Firm—Linda M. Robb (57) ABSTRACT

A method for reconstructing three dimensional shapes from two dimensional image domains uses glyph address carpets as a structured light pattern. The glyph address carpet includes a glyph encoding scheme in which the coordinates of any given point can be computed by looking at the glyph marks in a small neighborhood. The method includes calibrating at least one projecting device and at least one image detecting device and projecting a glyph address carpet pattern onto a three dimensional figure. The projected glyph address carpet pattern is detected and used to reconstruct the three dimensional coordinates for each readable glyph mark within the projected glyph address carpet pattern.

27 Claims, 5 Drawing Sheets

THREE-DIMENSIONAL ACTIVE VISION WITH GLYPH ADDRESS CARPET

The following U.S. patents and patent application are fully incorporated herein by reference: U.S. Pat. No. 5,825,933 ("Parallel Propagating Embedded binary Sequence for Parameterizing Two Dimensional Image Domain Code Patterns in Two Dimensional Address Space"); U.S. Pat. No. 6,076,738 ("Self-Clocking Glyph Shape Codes"); and U.S. patent application Ser. No. 10/270,698 ("Method and Apparatus for Implementing Spatial Pointers and Labeling Via Self-clocking Glyph Codes with Absolute Addressing for Determination and Calibration of Spatial Distortion and Image properties").

BACKGROUND

This disclosure relates generally to the reconstruction of surfaces in three dimensional space from a two-dimensional image capture and, more particularly, to glyph encoded pattern instantiations of such images through use of glyph address codes (address carpet).

Reconstruction of accurate three-dimensional shapes (including moving and/or deforming shapes) from two-dimensional image captures is a longstanding and commercially important problem in computer vision. Structured light techniques attempt to solve the problem with controlled illumination, which operates by projecting certain known and controlled patterns onto the target object. By observing the distortion of the patterns on the surface of the object and applying projective geometry, it is possible to digitally reconstruct the three dimensional shape of the object. However, existing structured light techniques (typically using repeated patterns such as stripes or lattices) suffer from difficulties with slow calibration and ambiguous registration, especially for complex scenes with occlusions.

The ambiguity problem may be demonstrated by the following example of two spheres positioned such that one partially occludes the other from the view of the camera. There may be two problems in interpreting the image captured by the camera in this process. Firstly, there may be insufficient information to enable mapping of the stripes one-to-one back to the original pattern. Secondly, from the viewing angle of the camera, part of the object may be occluded, which results in a discontinuity in the projected pattern in the captured image. Because of this discontinuity, the relationship between the stripes on different spheres is unknown. These two problems, in general referred to as ambiguity problems, present a challenge in the triangulation step.

These problems can be alleviated by bar coding in time or in color space. In Hall-Holt and Rusinkiewicz, "Stripe Boundary Codes for Real-Time Structured-Light Range Scanning of Moving Objects", ICCV 2001, Hall-Holt and Rusinkiewicz utilize a sequence of black and white stripe patterns in 4D space-time. Over a period of 4 frames, each stripe in each of the frames is turned on and off in a predetermined sequence, so that each stripe is uniquely identifiable in a large neighborhood if the on-off pattern is examined over a period of 4 frames. This technique works well except it is at the cost of sampling frequency.

The approach of bar-coding in color space is proposed by Zhang, Curless and Seitz, "Rapid Shape Acquisition Using Color Structured Light and Multi-pass Dynamic Programming", $1^{st}$ International Symposium on 3D Data Processing, Visualization, and Transmission, Padova, Italy, Jun. 19–21, 2002. This approach utilizes alternating color stripes as the illumination pattern, so that each group of adjacent color stripes is uniquely identifiable within a large neighborhood. This technique improves the sampling frequency, as pattern structure is readily identifiable. The order of the color stripes is carefully arranged so that each small group of color stripes can be uniquely identified. However, the color appearance on the object surface may interfere with color patterns and thus affects decodability and/or accuracy, which result in irregularities in the appearance of the object.

Unfortunately, none of these approaches provide accurate reconstruction of three-dimensional shapes from two-dimensional images of fast moving and/or deforming objects (for example, objects being rotated, translated, mutating, inserted or removed) having a wide variety of surface color appearances.

BRIEF SUMMARY

The disclosed embodiments provide examples of improved solutions to the problems noted in the above Background discussion and the art cited therein. There is shown in these examples an improved method for reconstructing three dimensional shapes from two dimensional image domains through the use of glyph address carpets as a structured light pattern. The glyph address carpet includes a glyph encoding scheme in which the coordinates of any given point can be computed by looking at the glyph marks in a small neighborhood. The method may provide some or all of the following features, which include calibrating at least one projecting device and at least one image detecting device and projecting a glyph address carpet pattern onto a three dimensional figure. The projected glyph address carpet pattern is detected and used to reconstruct the three-dimensional coordinates for each location of the readable glyph mark projection on the surface of the three dimensional figure.

In another embodiment, there is shown in these examples an improved system for reconstructing three dimensional shapes from two dimensional image domains through the use of glyph address carpets as a structured light pattern. The glyph address carpet includes a glyph encoding scheme in which the coordinates of any given point can be computed by looking at the glyph marks in a small neighborhood. The system may provide some or all of the following features, which include means for calibrating at least one projecting device and at least one image detecting device and means for projecting a glyph address carpet pattern onto a three dimensional figure. The projected glyph address carpet pattern is detected and used to reconstruct the three-dimensional coordinates for each location of the readable glyph mark projection on the surface of the three dimensional figure.

In yet another embodiment, there is shown in these examples an improved article of manufacture in the form of a computer usable medium having computer readable program code embodied in the medium which, when the program code is executed by the computer, causes the computer to perform method steps for reconstructing three dimensional shapes from two dimensional image domains through the use of glyph address carpets as a structured light pattern. The glyph address carpet includes a glyph encoding scheme in which the coordinates of any given point can be computed by looking at the glyph marks in a small neighborhood. The method may provide some or all of the following features, which include calibrating at least one projecting device and at least one image detecting device and projecting a glyph address carpet pattern onto a three dimensional figure. The projected glyph address carpet pattern is detected and used to reconstruct the three-dimensional coordinates for each location of the readable glyph mark projection on the surface of the three dimensional figure.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

DataGlyph technology, based on self-clocking glyph code, is a particularly effective and flexible encoding technology of data embedding pattern. Among other advantages, the technology uses positive marks of "slash" and "backslash" of the same size to represent "0" and "1". A pattern of such marks is much more robust under distortion and partial occlusion than a pattern with non-lattice structure, or of non-positive marks. This technology is described more fully in U.S. Pat. No. 6,076,738 (Bloomberg et al., "Self-Clocking Glyph Shape Codes") and U.S. Pat. No. 5,825,933 (Hecht, "Parallel Propagating Embedded Binary Sequence for Parameterizing Two Dimensional Image Domain Code Pattern in Two Dimensional Address Space") as well as U.S. patent application Ser. No. 10/270,698 (Hecht, "Method and Apparatus for Implementing Spatial Pointers and Labeling Via Self-clocking Glyph Codes with Absolute Addressing for Determination and Calibration of Spatial Distortion and Image Properties"), all of which are incorporated by reference hereinabove.

To address the problems described in the Background section, DataGlyph blocks, specifically address carpets, are used herein as structured light patterns, from which three-dimensional surfaces are reconstructed from two-dimensional images. The strength of an address carpet, which is carefully encoded with a pseudo-random code, is that it is possible to uniquely identify the "pattern coordinates" and even "pattern directional derivatives" of a specific point by looking at the glyph marks of a small neighborhood of glyph marks (as few as 24 marks if the pattern has a sequence size of $(2^{12}-1)\times(2^{12}-1)$). For the purposes herein, "pattern coordinates/derivatives", means the coordinates in the address space of the structured light pattern. In other words, if an address carpet is used as the pattern in a structured light approach, registration ambiguity may be removed, as it is not difficult to identify the pattern coordinates of any point. It is possible to reconstruct the visible part of a three-dimensional shape in a single snapshot of the image, so it is possible to capture moving and/or deforming objects with a higher temporal sampling rate. Also, it works well with a wide variety of surface appearances, as color interference is minimal with a monochrome pattern.

Figure 1:
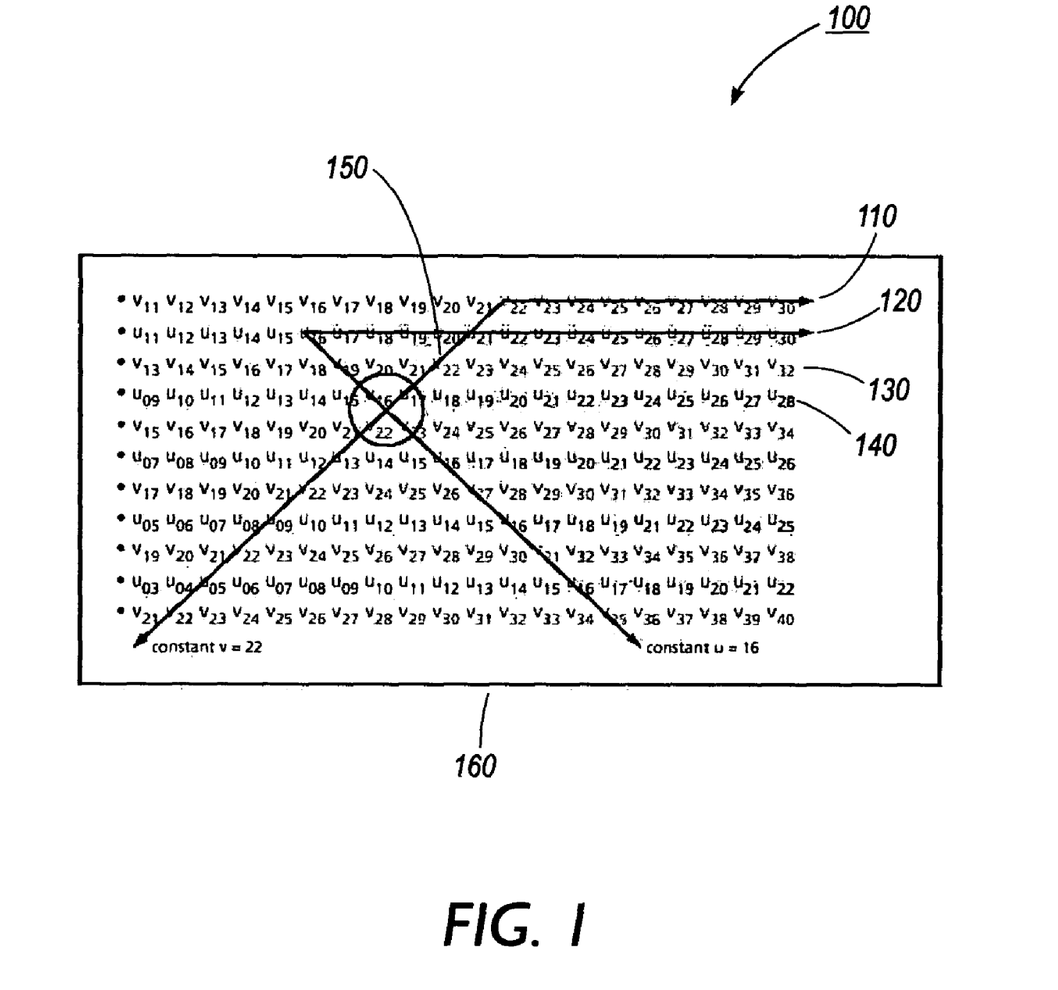
FIG. 1 is an illustration of an example embodiment of an address carpet utilized as a structured light pattern.

An address carpet is a DataGlyph image-encoding scheme in which the coordinates of any given point can be computed based on the glyph marks in a small neighborhood. An example of address carpet code interlaces two sets of parallel one-dimensional address codes (for example, PN(Pseudo-random Noise) sequence of length $2^{12}-1$) with successive code lines in each set progressively offset, shifting odd rows two glyphs forward and even rows two glyphs backward, as seen in FIG. 1. In the figure, alternating 'v' code sequence lines, beginning at line 110, are interlaced with alternating 'u' sequence lines, beginning at line 120. As shown in lines 110 and 130, initial 'v' code set at line 110 segment is offset from the next 'v' code set at line 130 by being shifted two glyphs forward, from $v_{11}$ to $V_{13}$. Similarly, the 'u' code sets are offset by being shifted two glyphs backward, from $u_{11}$ to $u_{09}$.

This results in diagonal loci 150 and 160 of constant code phase, which intersect to define a unique 2D address location. The image-capture system can use the diagonal patterns of redundant glyph marks on the alternating rows to determine correct bit values in the presence of severe graphic clutter, including overprinted text and line art or even other glyph codes. Objects may be thought of as sitting on a location in the address carpet that defines their logical position in abstract space or a physical position in real space. Other interleaved or even superimposed codes can augment address carpets.

Besides 2D address location, the local pattern of address code glyph locations also defines the first order directional derivatives of any given point in the pattern address space. In other words, if (u,v) is the coordinates of the point P in the pattern address space, by observing the locations of the glyph marks in the neighborhood of P, one can estimate point (u+δu, v+δv) for a small vector (δu, δv).

Figure 2:
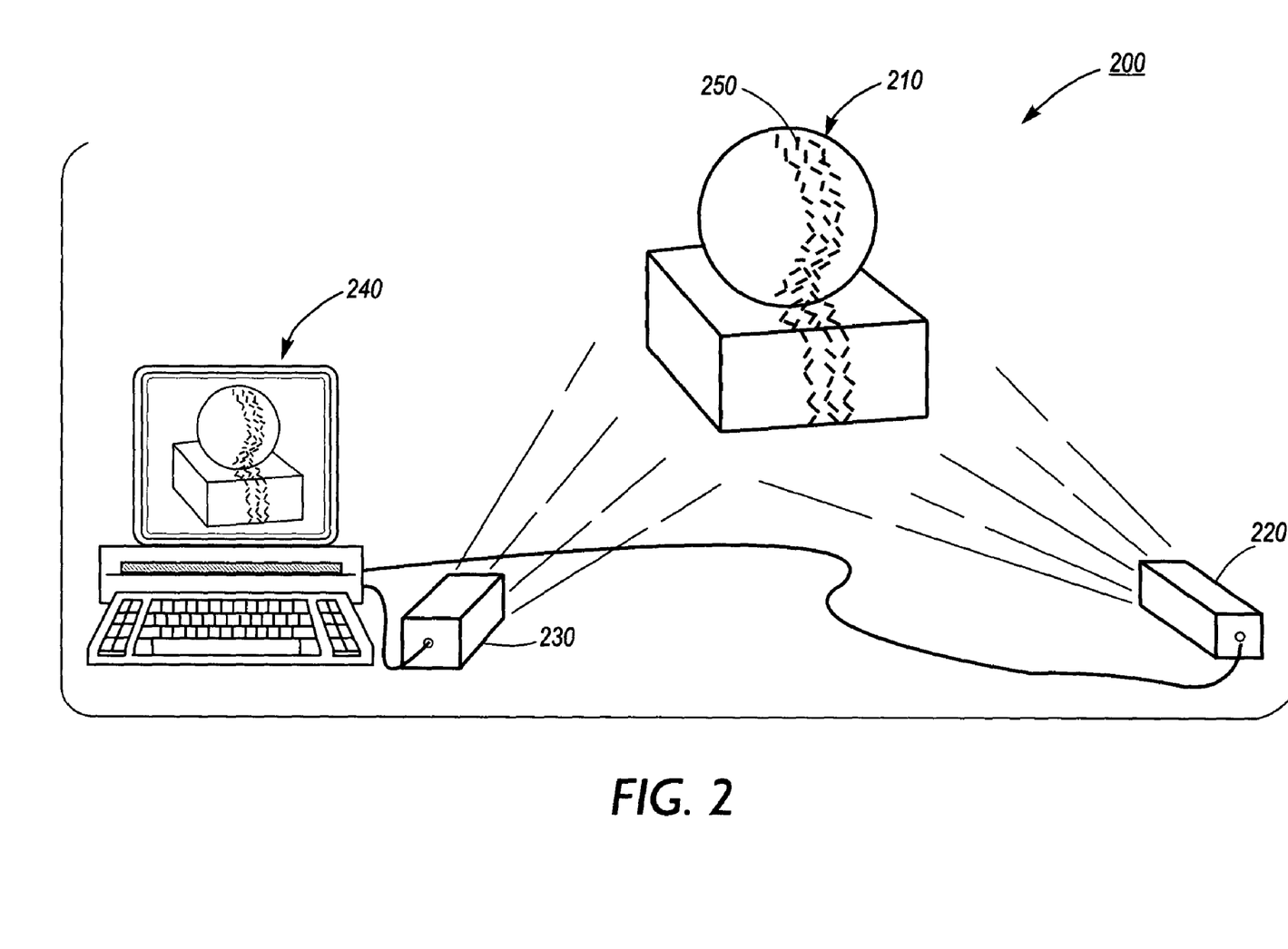
FIG. 2 is a diagram illustrating the components of a system for utilizing a glyph address carpet as a structured light pattern.

The use of DataGlyph code patterns, specifically address carpets, as structured light patterns is illustrated in FIG. 2. Illumination including example address carpet pattern 250 is projected, in either monochrome or light not visible to the human eye (e.g., infrared), on the surface of target object 210, which in this example case is an assemblage of objects, with projecting means 220. While for the purposes of the discussion of this embodiment monochrome is utilized as an example, it will be appreciated that the address carpet pattern could be projected in any color or a combination of colors, all of which are contemplated by the specification and scope of the claims herein. Projecting means 220 may be a projector of any known type capable of providing sufficiently high resolution and low distortion of the address carpet pattern. The projector may be isolated from any computer (such as an overhead slide projector), or a digital light projector may be connected to a computer. Image detecting means 230, for example a camera, captures an image of the object with the illumination pattern projected on its surface. Image detector 230 may be connected to a computing means 240, for example a desktop computer, which performs the calculations necessary for reconstruction of a three dimensional surface from address carpet coordinates decoded from a two dimensional image.

The system then systematically traverses the captured image, which may be accomplished by rotating the objects or assemblage of objects 210 on a rotating platform (not shown) while projector 220 remains stationary. Alternatively, projector 220 may be mounted on a mechanism (not shown), which revolves around the stationary object or assemblage of objects 210. Images captured by image detector 230 may be transferred to computing device 240 by means of a high speed connection for real time processing, or may be stored in any know form (for example, CD or DVD) for later processing off line. At each point of interest, a neighborhood of projected DataGlyph marks are examined to compute the coordinates and local pattern orientation over the address space of the projected pattern. With the pattern coordinates and orientation, along with the positions and orientations of the image detector and the projector (which are known from the calibration step, discussed in more detail hereinbelow with reference to FIG. 3), the system is able to compute the 3D coordinates of the point.

For the purposes herein and for simplicity, address carpet pattern 250 is illustrated as a series of forward slashes and back slashes. However, those knowledgeable in the art will readily appreciate the sample glyphs marks could also include "+" and "x" glyph marks or could combine slash glyph marks with stripes or lattice patterns, all of which are contemplated by the specification and scope of the claims herein.

Various computing environments may incorporate the analysis of the DataGlyph address carpet as a structured light pattern. The following discussion is intended to provide a brief, general description of suitable computing environments in which the approach may be implemented. Although not required, the approach will be described in the general context of computer-executable instructions, such as program modules, being executed by a networked computer. Generally, program modules include routines, programs, objects, components, data structures, etc. that performs particular tasks or implement particular abstract data types. Moreover, those skilled in the art will appreciate that the approach may be practiced with other computer system configurations, including hand-held devices, multi-processor systems, microprocessor-based or programmable consumer electronics, networked PCs, minicomputers, mainframe computers, and the like. The approach may also be practiced in distributed computing environments where tasks are performed by remote processing devices that are linked through a communications network. In a distributed computing environment, program modules may be located in both local and remote memory storage devices.

Figure 3:
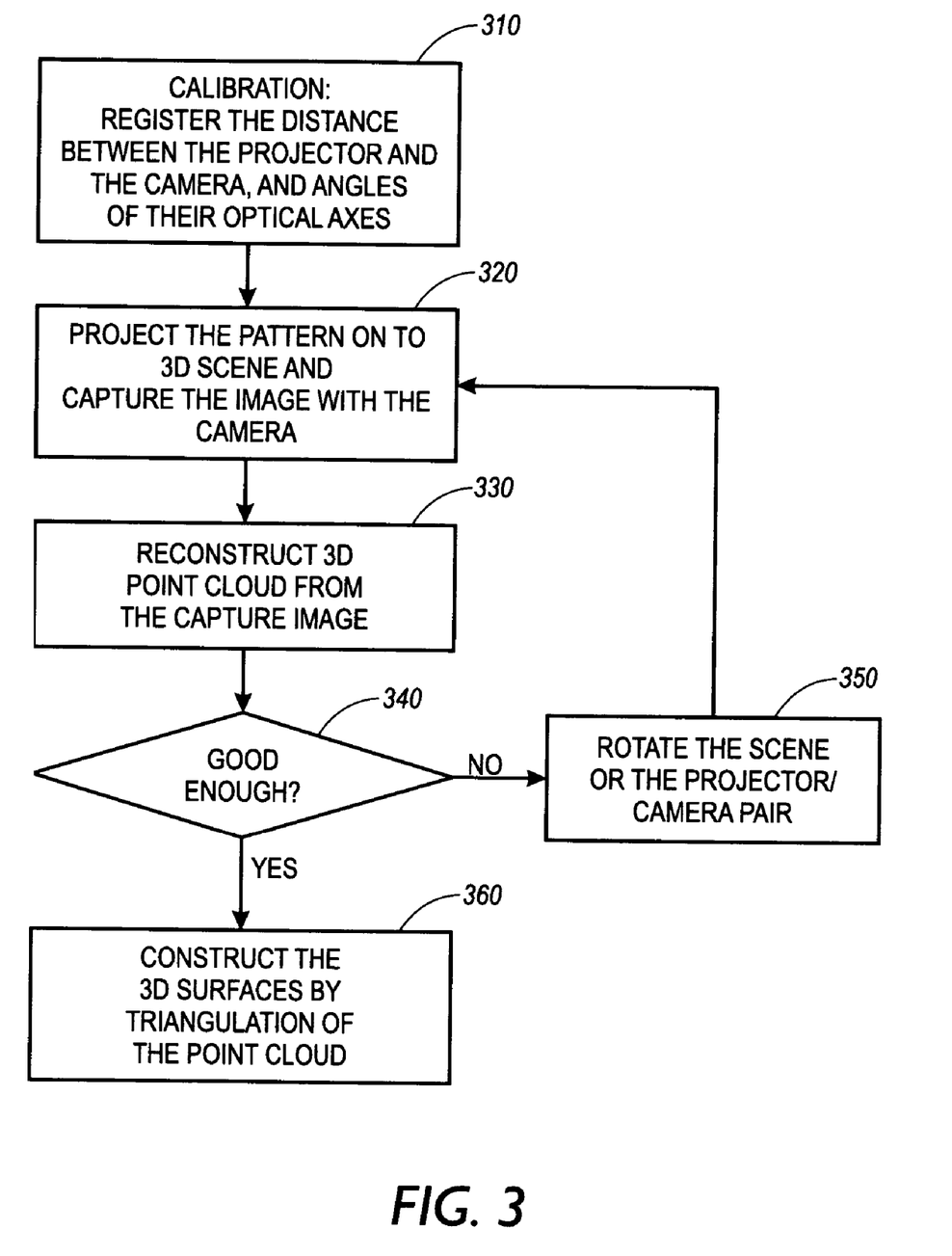
FIG. 3 is a flowchart illustrating one embodiment of the method for utilizing a glyph address carpet to reconstruct a three-dimensional object.

Turning now to FIG. 3, the flowchart illustrates an embodiment of the method employed to reconstruct a three-dimensional object surface utilizing a glyph address carpet. In this example embodiment, a computing device is connected with an image detector and a projector for on-line, real time reconstruction. At 310 the system is calibrated, to determine the relative positions between the image detector and the projector, as well as their optical axes with respect to each other. The system may be calibrated by either:

(1) mounting the projector and the image detector to a mechanism (for example a rack) with known shape and known dimensions; or (2) projecting known patterns to a simple objector (for example a cube) of known dimensions, and analyzing the image of the scene captured by the image detector.

Figure 5:
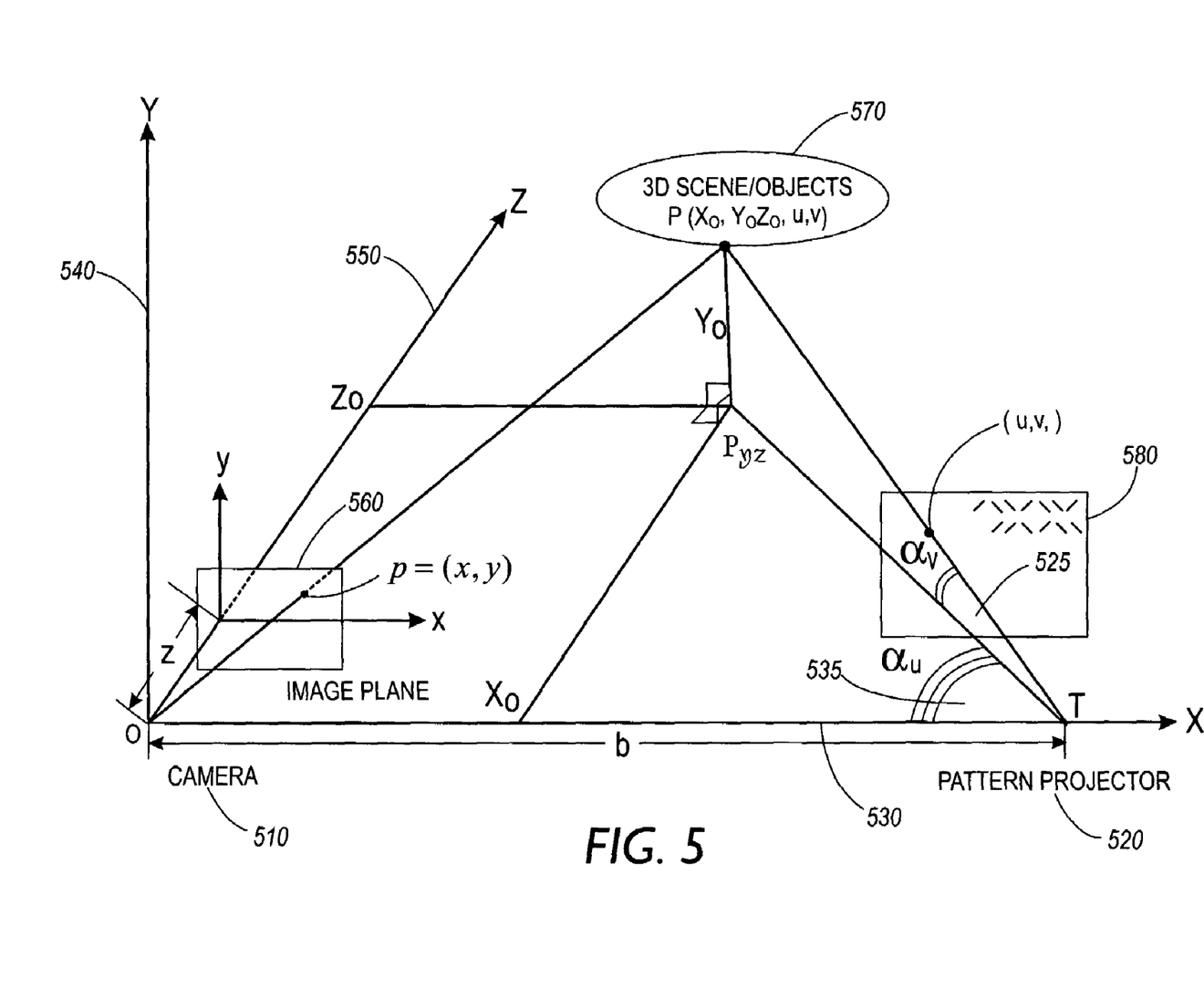
FIG. 5 is a diagram illustrating the mathematical analysis for inferring a three-dimensional point location based on a captured image.

The detail of the analysis is similar to that presented with reference to FIG. 5, and also may be found in the literature discussing three dimensional reconstruction with structured light. A glyph pattern is then projected onto one side of a three-dimensional scene 320, which may include a single object, or an assemblage of objects having either adjacent or non-adjacent surfaces. The image of the three-dimensional scene with the dataglyph address carpet pattern projection is recorded by the image detector.

At 330 a three-dimensional point cloud is reconstructed from the capture image, discussed more fully with respect to FIG. 4 hereinbelow. A determination is made at 340 as to whether the image is satisfactory (for example, sufficiently completed). If the image is not sufficiently completed, either the scene/object is rotated, or the projector/image detector pair is moved, as shown at 350, or a pattern with different resolution (for example, a finer resolution) may be used. The DataGlyph pattern is again projected onto the scene/object, and the scene/object with Dataglyph pattern projected thereon is captured by the camera, and a three-dimensional point cloud is reconstructed from the capture image. This procedure is repeated until the reconstructed three-dimensional surface is satisfactory, at which time the three-dimensional surfaces are constructed by triangulation from the point cloud, shown at 360 and described more fully with respect to FIG. 5. Alternatively, the captured images may be stored on media such as a CD or DVD for later processing off line.

Figure 4:
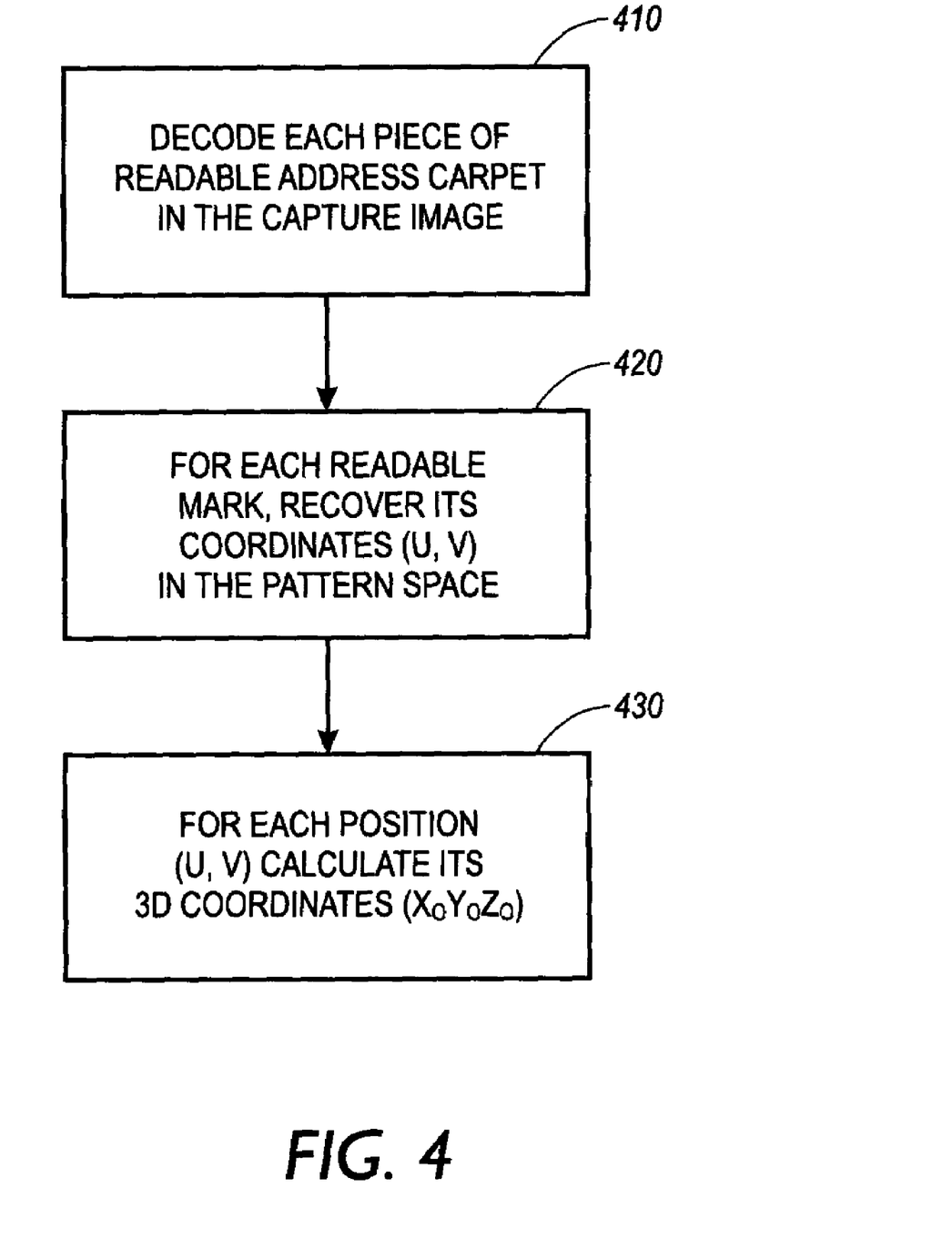
FIG. 4 is a flowchart illustrating reconstruction of a three-dimensional point cloud from a captured image.

As noted hereinabove, FIG. 4 illustrates reconstruction of a three-dimensional point cloud from a captured image. At 410 each piece of the readable address carpet, which for the purposes of describing this embodiment, will include an image segment bearing an unambiguous, unique address (typically twenty-four or more glyph marks in the captured image), is decoded. The decoded message forms the addresses of the glyph marks in the pattern address space, or the coordinates (u, v). The coordinates (u, v) for each readable glyph mark in the pattern space is decoded at 420. At 430 the three-dimensional coordinates $(x_0, y_0, z_0)$ are calculated for each glyph position (u, v), as discussed further with respect to FIG. 5.

Turning now to FIG. 5, there is illustrated the mathematical analysis for inferring a three-dimensional point location based on a capture image. For the purposes of this discussion, pattern projector 520 and image detector 510 are positioned along baseline 530 which is defined as the X-axis. Image detector 510 is located at the origin 0=(0,0,0), which is the point at which Y-axis 540, X-axis 530, and Z-axis 550 intersect. Pattern projector 520 is located at point T=(b,0,0), with b being the distance between the camera 510 and the projector 520. Also, Z-axis 550 is defined as coinciding with the optical axis of image detector 510, resulting in the image plane 560 being located at Z=(0,0,z), since it is assumed that the axes of the image plane 560 parallel to X-axis 530 and Y-axis 540.

Projector 520 projects a pattern of dataglyph marks onto the surface of three-dimensional object 570. The dataglyph pattern is structured such that the global position (u,v) of a mark with respect to the whole pattern can be computed by examining a small neighborhood of marks surrounding it. This type of pattern, an address carpet, is discussed in more detail hereinabove. Image detector 510 views a projected mark (u,v) on the surface of three-dimensional object 570 and the system determines the three-dimensional position of the point $P=(X_0, Y_0, Z_0)$ on the surface.

For the purpose of this illustration, a simple projector model is used, consisting of a point light source at T and a transparent screen with opaque dataglyph address carpet pattern 580. The point light source at T projects the shadow of the dataglyph marks onto the three-dimensional objects 570. Angle $\alpha_u$ is defined as the angle 535 between T0 and $TP_{yz}$. Angle $\alpha_v$ is defined as the angle 525 between $TP_{yz}$ and TP, where $P_{yz}$ is the projection of P on the YZ-plane. Angles $\alpha_u$ and $\alpha_v$ can be computed from the coordinates (u,v) of the pattern and the model of the projector 520. Image detector 510 at 0 views point P at p=(x,y) on its image plane, and from the ray theorem $$\frac{X_0}{x} = \frac{Y_0}{y} = \frac{Z_0}{z}.$$

Examining the right triangle formed by T, $P_{yz}$, and ($X_0$, 0, 0), it follows from trigonometry that, $$\tan(\alpha_u) = \frac{Z_0}{b - X_0}.$$

Solving for the system for $X_0$, $Y_0$ and $Z_0$, the position of P is obtained by $$X_0 = \frac{\tan(\alpha_u) \cdot b \cdot x}{z + x \cdot \tan(\alpha_u)},$$
$$Y_0 = \frac{\tan(\alpha_u) \cdot b \cdot y}{z + x \cdot \tan(\alpha_u)},$$
$$Z_0 = \frac{\tan(\alpha_u) \cdot b \cdot z}{z + x \cdot \tan(\alpha_u)}.$$

As will be appreciated by one skilled in the art, this analysis would be modified for instances in which the projector and the camera are not positioned on a common baseline, or when the axes of the image plane do not coincide with the X-axis and the Y-axis. The above is intended to present one possible approach for determining point position, and is not intended to limit other modifications or approaches, which are fully contemplated as being within the scope of the specification and claims herein.

The strength of the address carpet approach is that it is possible to uniquely identify the pattern coordinates and even directional derivatives of each specific point by looking at the glyph marks of a very small neighborhood (about 24 marks or so). In other words, if an address carpet is used as the pattern in a structured light approach, it is easy to remove registration ambiguity as it is not difficult to identify the pattern coordinates of any point. It is possible to reconstruct a three-dimensional shape with a single snapshot of image, so it is possible to capture moving and/or deforming objects with a high temporal sampling rate. And the approach works for a wide variety of surface appearances, as color interference is minimal with a monochrome pattern or with a projected pattern not visible to the human eye (e.g., infrared) pattern. Furthermore, as redundancy is built into the address code, color or shade interference does not affect decodability. Another advantage of this approach is that, by using positive marks of the same size for "0"s and "1"s, the pattern is much more robust under distortion and occlusion.

While the present discussion has been illustrated and described with reference to specific embodiments, further modification and improvements will occur to those skilled in the art. For example, the DataGlyph pattern may be used in combination with stripe or lattice patterns, alternating either spatially, temporally, or in different colors, to achieve more accuracy. Additionally, the marks used may differ from the slash/backslash marks discussed hereinabove. For example, the marks may be in the shapes of "+" sign and "x" sign, denoting "0" and "1". Such a design has several advantages.

1) It is very easy for an image processing system to locate the centers of the cross signs ("x" or "+").
2) When used in combination with stripe or lattice patterns, the stripes help define the orientation of the pattern, so that "+"s and "x"s are distinguishable at any viewing angle.
3) With the help of the stripes, it is easy to reconstruct the sharp features of the 3D shape (essentially, with a high sampling rate at the same orientation as the stripes).

Also, "code" as used herein, or "program" as used herein, is any plurality of binary values or any executable, interpreted or compiled code, which can be used by a computer or execution device to perform a task. This code or program can be written in any one of several known computer languages. A "computer", as used herein, can mean any device which stores, processes, routes, manipulates, or performs like operation on data. It is to be understood, therefore, that the disclosure is not limited to the particular forms illustrated and that it is intended in the appended claims to embrace all alternatives, modifications, and variations which do not depart from the spirit and scope of the embodiments described herein.

What is claimed is:

1. A method for reconstructing three dimensional shapes from two dimensional image domains using glyph address carpets as a structured light pattern, wherein the glyph address carpet includes a glyph encoding scheme in which the coordinates of any given point can be computed by looking at the glyph marks in a small neighborhood, the method comprising:
    calibrating at least one projecting device and at least one image detecting device, wherein calibrating includes registering the distance between said projecting device and said image detecting device and registering the angles of the optical axes of said projecting device and said image detecting device;
    projecting at least one glyph address carpet pattern onto a three dimensional figure, wherein said three dimensional figure is in an operative relationship with said at least one projecting device and said at least one image detecting device;
    detecting the image of said projected glyph address carpet pattern on said three dimensional figure with said image detecting device; and
    reconstructing a three dimensional point cloud from said detected projected glyph address carpet pattern, wherein said three dimensional point cloud comprises the three dimensional coordinates for each readable glyph mark within said projected glyph address carpet pattern.

2. The method for reconstructing three dimensional shapes from two dimensional image domains according to claim 1, wherein said image detecting device comprises a camera.

3. The method for reconstructing three dimensional shapes from two dimensional image domains according to claim 2, wherein said camera comprises a video camera.

4. The method for reconstructing three dimensional shapes from two dimensional image domains according to claim 1, wherein said glyph address carpet pattern comprises a pattern of slash and back-slash glyph marks.

5. The method for reconstructing three dimensional shapes from two dimensional image domains according to claim 4, wherein said glyph address carpet pattern comprises a pattern of stripes and said pattern of slash and back-slash glyph marks.

6. The method for reconstructing three dimensional shapes from two dimensional image domains according to claim 4, wherein said glyph address carpet pattern comprises a lattice pattern and said pattern of slash and back-slash glyph marks.

7. The method for reconstructing three dimensional shapes from two dimensional image domains according to claim 1, wherein said glyph address carpet pattern comprises a pattern of "+" and "x" glyph symbols.

8. The method for reconstructing three dimensional shapes from two dimensional image domains according to claim 7, wherein said glyph address carpet pattern comprises a pattern of stripes and said pattern of "+" and "x" glyph symbols.

9. The method for reconstructing three dimensional shapes from two dimensional image domains according to claim 7, wherein said glyph address carpet pattern comprises a lattice pattern and said pattern of "+" and "x" glyph symbols.

10. The method for reconstructing three dimensional shapes from two dimensional image domains according to claim 1, wherein reconstructing a three dimensional point cloud from said detected projected glyph address carpet pattern comprises:
    decoding each piece of readable address carpet in said detected image;
    determining the two dimensional coordinates in the pattern space for each readable glyph; and
    calculating the three dimensional coordinates for each readable glyph position.

11. The method for reconstructing three-dimensional shapes from two-dimensional image domains according to claim 1, further comprising:
    determining whether said reconstructed three-dimensional point cloud sufficiently describes said three-dimensional figure;
    modifying said operative relationship among said at least one projecting device, said at least one image detecting device, and said three dimensional figure if said reconstructed three dimensional point cloud does not sufficiently describe said three dimensional figure;
    repeating projecting at least one glyph address carpet pattern onto said three dimensional figure, detecting said image of said projected glyph address carpet pattern, and reconstructing said three dimensional point cloud until said reconstructed three dimensional point cloud sufficiently describes said three dimensional figure; and
    constructing the three dimensional surfaces of said figure by triangulation of said three-dimensional point cloud.

12. The method for reconstructing three dimensional shapes from two dimensional image domains according to claim 1, wherein said detected images are transferred to a computing device for reconstructing said three dimensional point cloud in real time.

13. The method for reconstructing three dimensional shapes from two dimensional image domains according to claim 1, wherein said detected images are transferred to a storage device for reconstructing said three dimensional point cloud off line.

14. A system for reconstructing three dimensional shapes from two dimensional image domains using glyph address carpets as a structured light pattern, wherein the glyph address carpet includes a glyph encoding scheme in which the coordinates of any given point can be computed by looking at the glyph marks in a small neighborhood, the system comprising:

means for projecting at least one glyph address carpet pattern onto a three dimensional figure, wherein said three dimensional figure is in an operative relationship with said at least one projecting device and said at least one image detecting device;

means for detecting the image of said projected glyph address carpet pattern on said three dimensional figure with said image detecting device;

means for calibrating at least one projecting device and at least one image detecting device, wherein calibrating includes registering the distance between said projecting device and said image detecting device and registering the angles of the optical axes of said projecting device and said image detecting device; and means for reconstructing a three dimensional point cloud from said detected projected glyph address carpet pattern, wherein said three dimensional point cloud comprises the three dimensional coordinates for each readable glyph mark within said projected glyph address carpet pattern.

15. The system for reconstructing three dimensional shapes from two dimensional image domains according to claim 14, wherein said image detecting device comprises a camera.

16. The system for reconstructing three dimensional shapes from two dimensional image domains according to claim 14, wherein said glyph address carpet pattern comprises a pattern of slash and back-slash glyph marks.

17. The system for reconstructing three dimensional shapes from two dimensional image domains according to claim 16, wherein said glyph address carpet pattern comprises a pattern of stripes and said pattern of slash and back-slash glyph marks.

18. The system for reconstructing three dimensional shapes from two dimensional image domains according to claim 16, wherein said glyph address carpet pattern comprises a lattice pattern and said pattern of slash and back-slash glyph marks.

19. The system for reconstructing three dimensional shapes from two dimensional image domains according to claim 14, wherein said glyph address carpet pattern comprises a pattern of "+" and "x" glyph symbols.

20. The system for reconstructing three dimensional shapes from two dimensional image domains according to claim 19, wherein said glyph address carpet pattern comprises a pattern of stripes and said pattern of "+" and "x" glyph symbols.

21. The system for reconstructing three dimensional shapes from two dimensional image domains according to claim 19, wherein said glyph address carpet pattern comprises a lattice pattern and said pattern of "+" and "x" glyph symbols.

22. The system for reconstructing three dimensional shapes from two dimensional image domains according to claim 14, wherein means for reconstructing a three dimensional point cloud from said detected projected glyph address carpet pattern comprises:
    means for decoding each piece of readable address carpet in said detected image;
    means for determining the two dimensional coordinates in the pattern space for each readable glyph; and
    means for calculating the three dimensional coordinates for each readable glyph position.

23. The system for reconstructing three dimensional shapes from two dimensional image domains according to claim 14, further comprising:

means for determining whether said reconstructed three-dimensional point cloud sufficiently describes said three dimensional figure;

means for modifying said operative relationship among said at least one projecting device, said at least one image detecting device, and said three dimensional figure if said reconstructed three dimensional point cloud does not sufficiently describe said three dimensional figure;

means for repeating projecting at least one glyph address carpet pattern onto said three dimensional figure, detecting said image of said projected glyph address carpet pattern, and reconstructing said three dimensional point cloud until said reconstructed three dimensional point cloud sufficiently describes said three dimensional figure; and means for constructing the three-dimensional surfaces of said figure by triangulation of said three dimensional point cloud.

24. The system for reconstructing three dimensional shapes from two dimensional image domains according to claim 14, wherein said camera comprises a video camera.

25. The system for reconstructing three dimensional shapes from two dimensional image domains according to claim 14, wherein said detected images are transferred to a computing device for reconstructing said three dimensional point cloud in real time.

26. The system for reconstructing three dimensional shapes from two dimensional image domains according to claim 14, wherein said detected images are transferred to a storage device for reconstructing said three dimensional point cloud off-line.

27. An article of manufacture comprising a computer usable medium having computer readable program code embodied in said medium which, when said program code is executed by said computer causes said computer to perform method steps for reconstructing three dimensional shapes from two dimensional image domains using glyph address carpets as a structured light pattern, wherein the glyph address carpet includes a glyph encoding scheme in which the coordinates of any given point can be computed by looking at the glyph marks in a small neighborhood, the method comprising:

calibrating at least one projecting device and at least one image detecting device, wherein calibrating includes registering the distance between said projecting device and said image detecting device and registering the angles of the optical axes of said projecting device and said image detecting device;

projecting at least one glyph address carpet pattern onto a three dimensional figure, wherein said three dimensional figure is in an operative relationship with said at least one projecting device and said at least one image detecting device;

detecting the image of said projected glyph address carpet pattern on said three dimensional figure with said image detecting device; and reconstructing a three dimensional point cloud from said detected projected glyph address carpet pattern, wherein said three dimensional point cloud comprises the three dimensional coordinates for each readable glyph mark within said projected glyph address carpet pattern.

* * * * *